US012675434B2

(12) United States Patent　　　(10) Patent No.:　US 12,675,434 B2
Chakraborty et al.　　　　　　　(45) Date of Patent:　　Jul. 7, 2026

(54) IRREGULAR CADENCE DATA PROCESSING UNITS

(71) Applicant: Google LLC, Mountain View, CA (US)

(72) Inventors: Indranil Chakraborty, Mountain View, CA (US); Rahul Nagarajan, San Jose, CA (US); Christopher Aaron Clark, Madison, WI (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 18/542,985

(22) Filed: Dec. 18, 2023

(65) Prior Publication Data

US 2025/0181551 A1　　Jun. 5, 2025

Related U.S. Application Data

(60) Provisional application No. 63/605,728, filed on Dec. 4, 2023.

(51) Int. Cl.
*G06F 15/80*　　　(2006.01)
*G06F 17/16*　　　(2006.01)

(52) U.S. Cl.
CPC ...... *G06F 15/8053* (2013.01); *G06F 15/8061* (2013.01); *G06F 17/16* (2013.01)

(58) Field of Classification Search
CPC ... G06F 17/16; G06F 15/8053; G06F 15/8061
See application file for complete search history.

(56) References Cited

U.S. PATENT DOCUMENTS 9,805,001 B2　10/2017　Narayanaswami et al.
9,898,441 B2　2/2018　Narayanaswami et al.

9,952,831 B1　4/2018　Ross et al.
9,959,247 B1　5/2018　Woo et al.
10,146,738 B2　12/2018　Nurvitadhi et al.
10,180,928 B2　1/2019　Nurvitadhi et al.
10,261,786 B2　4/2019　Lacy et al.
10,635,740 B2　4/2020　Phelps et al.
10,824,938 B2　11/2020　Barik et al.
10,943,167 B1　3/2021　Amirineni et al.
11,113,784 B2　9/2021　Ray et al.
11,328,037 B2　5/2022　Mnger et al.
11,636,327 B2　4/2023　Nurvitadhi et al.
2021/0081354 A1　3/2021　Zhang et al.
2022/0261622 A1*　8/2022　Norrie ................. G06F 9/30036

OTHER PUBLICATIONS

Extended European Search Report for European Patent Application No. 24206432.7 dated Mar. 6, 2025. 10 pages.

* cited by examiner

*Primary Examiner* — Courtney P Spann

(74) *Attorney, Agent, or Firm* — Lerner David LLP

(57)　　　ABSTRACT

Aspects of the disclosure are directed to an architecture including a dynamic serialization buffer and/or dynamic deserialization buffer coupled between a vector processing unit and a matrix multiplication unit. The dynamic serialization buffer and/or dynamic deserialization buffer allow for streaming any integer of vectors per cycle when performing acceleration of matrix multiplication operations. The matrix multiplication unit receives vectors equivalent to an amount of data from the vector processing unit at an arbitrary rate of vectors per cycle. The matrix multiplication unit processes the vectors to generate resulting vectors that are output at the arbitrary rate.

20 Claims, 8 Drawing Sheets

| Cycles | Instruction | Vectors Sent |
|--------|-------------|--------------|
| 0 | vmatmul v0 | 12 (v0) |
| 1 | nop | 12 (v0) |
| 2 | nop | 12 (v0) |
| 3 | nop | 12 (v0) |
| 4 | nop | 12 (v0) |
| 5 | vmatmul v1 | 4 (v0), 8 (v1) |
| 6 | nop | 12 (v1) |
| 7 | nop | 12 (v1) |
| 8 | nop | 12 (v1) |
| 9 | nop | 12 (v1) |
| 10 | vmatmul v2 | 8 (v1), 4 (v2) |
| 11 | nop | 12 (v2) |
| 12 | nop | 12 (v2) |
| 13 | nop | 12 (v2) |
| 14 | nop | 12 (v2) |
| 15 | nop | 12 (v2) |
| 16 | vmatmul v3 | 12 (v3) |

800

Process data using a dynamic serialization buffer — 810

Process the data using a matrix multiplication unit — 820

Process the data using a dynamic deserialization buffer — 830

IRREGULAR CADENCE DATA PROCESSING UNITS

CROSS-REFERENCE TO RELATED APPLICATIONS

The present application claims the benefit of the filing date of U.S. Provisional Patent Application No. 63/605,728, filed Dec. 4, 2023, the disclosure of which is hereby incorporated herein by reference.

BACKGROUND

Data processing units can use matrix multiplication units, such as systolic arrays, to accelerate matrix multiplication operations. The matrix multiplication units can interface with vector processing units to receive streaming operands and latched operands. The throughput of the matrix multiplication unit is determined by the number of elements in the streaming operand vector that the matrix multiplication unit can process per clock cycle. For example, if the matrix multiplication unit processes M vectors per cycle, with each vector containing N elements, a single register value is streamed over $$\frac{E}{(M \times N)}$$

cycles, where E is a number of elements provided by a vector register of the vector processing unit. E can be equivalent to a lane dimension of the vector processing unit multiplied by a sublane dimension of the vector processing unit multiplied by a number of elements per vector register of the vector processing unit. To maintain atomicity of the single register value provided to the matrix multiplication unit, the value of M is configured such that the number of cycles is an integer value. For example, for lane=128, sublane=8, number elements per vector register=2, and N=256, M can be one of 2, 4, or 8. This constrains the scaling of the matrix multiplication unit to be a multiple-of-two ratio. Such a constraint decreases the throughput of the matrix multiplication unit, resulting in slower processing for accelerating the matrix multiplication operations.

BRIEF SUMMARY

Aspects of the disclosure are directed to an architecture including a dynamic serialization buffer and/or dynamic deserialization buffer coupled between a vector processing unit and a matrix multiplication unit. The dynamic serialization buffer and/or dynamic deserialization buffer allow for streaming any integer of vectors per cycle when performing acceleration of matrix multiplication operations. The matrix multiplication unit receives vectors equivalent to an amount of data from the vector processing unit at an arbitrary rate of vectors per cycle. The matrix multiplication unit processes the vectors to generate resulting vectors that are output at the arbitrary rate.

An aspect of the disclosure provides for an architecture for arbitrary throughput of matrix multiplication, the architecture including: a dynamic serialization buffer configured to: receive a first amount of data from a first vector register; output a second amount of data, the second amount of data being less than the first amount of data, at each of a number of cycles until the dynamic serialization buffer contains an amount of data less than the second amount of data; and in response to containing the amount of data less than the second amount of data, receive a subsequent first amount of data from the first vector register or a second vector register; a matrix multiplication unit configured to: receive the second amount of data; process the second amount of data to generate a third amount of data representing results of the matrix multiplication; and output the third amount of data; and a dynamic deserialization buffer configured to: receive the third amount of data at each of the cycles until the dynamic deserialization buffer contains an amount of data greater than a fourth amount of data, the fourth amount of data being greater than the third amount of data; and in response to containing the amount of data greater than the fourth amount of data, output the fourth amount of data to the first vector register, the second vector register, or a third vector register.

In an example, the architecture further includes a vector processing unit including at least one of the first vector register, second vector register, or third vector register. In another example, the matrix multiplication unit is a systolic array.

In yet another example, the first amount of data is equal to a lane dimension multiplied by a sublane dimension multiplied by a number of elements per vector register. In yet another example, the second amount of data is equal to an arbitrary amount of vectors per cycle. In yet another example, the third amount of data is equal to an arbitrary amount of vectors per cycle. In yet another example, the second amount of data and the third amount of data are equivalent. In yet another example, the fourth amount of data is equal to a lane dimension multiplied by a sublane dimension multiplied by a number of elements per vector register.

In yet another example, the serialization buffer has a depth based on a maximum amount of data that the amount of data less than the second amount of data can be. In yet another example, the deserialization buffer has a depth based on a maximum amount of data that can remain in the deserialization buffer when the fourth amount of data is output.

Another aspect of the disclosure provides for a method for arbitrary throughput of matrix multiplication, the method including: receiving, by a dynamic serialization buffer, a first amount of data from a first vector register; outputting, by the dynamic serialization buffer, a second amount of data, the second amount of data being less than the first amount of data, at each of a number of cycles until the dynamic serialization buffer contains an amount of data less than the second amount of data; in response to containing the amount of data less than the second amount of data, receiving, by the dynamic serialization buffer, a subsequent first amount of data from the first vector register or a second vector register; receiving, by a matrix multiplication unit, the second amount of data; processing, by the matrix multiplication unit, the second amount of data to generate a third amount of data representing results of the matrix multiplication; outputting, by the matrix multiplication unit, the third amount of data; receiving, by a dynamic deserialization buffer, the third amount of data at each of the cycles until the dynamic deserialization buffer contains an amount of data greater than a fourth amount of data, the fourth amount of data being greater than the third amount of data; and in response to containing the amount of data greater than the fourth amount of data, outputting, by the dynamic deserialization buffer, the fourth amount of data to the first vector register, the second vector register, or a third vector register.

In an example, the first amount of data is equal to a lane dimension multiplied by a sublane dimension multiplied by a number of elements per vector register. In another example, the second amount of data is equal to an arbitrary amount of vectors per cycle. In yet another example, the third amount of data is equal to an arbitrary amount of vectors per cycle. In yet another example, the fourth amount of data is equal to a lane dimension multiplied by a sublane dimension multiplied by a number of elements per vector register.

Yet another aspect of the disclosure provides for a non-transitory computer readable medium storing instructions that, when executed by one or more processors, cause the one or more processors to perform operations for arbitrary throughput of matrix multiplication, the operations including: receiving, by a dynamic serialization buffer, a first amount of data from a first vector register; outputting, by the dynamic serialization buffer, a second amount of data, the second amount of data being less than the first amount of data, at each of a number of cycles until the dynamic serialization buffer contains an amount of data less than the second amount of data; in response to containing the amount of data less than the second amount of data, receiving, by the dynamic serialization buffer, a subsequent first amount of data from the first vector register or a second vector register; receiving, by a matrix multiplication unit, the second amount of data; processing, by the matrix multiplication unit, the second amount of data to generate a third amount of data representing results of the matrix multiplication; outputting, by the matrix multiplication unit, the third amount of data; receiving, by a dynamic deserialization buffer, the third amount of data at each of the cycles until the dynamic deserialization buffer contains an amount of data greater than a fourth amount of data, the fourth amount of data being greater than the third amount of data; and in response to containing the amount of data greater than the fourth amount of data, outputting, by the dynamic deserialization buffer, the fourth amount of data to the first vector register, the second vector register, or a third vector register.

In an example, the first amount of data is equal to a lane dimension multiplied by a sublane dimension multiplied by a number of elements per vector register. In another example, the second amount of data is equal to an arbitrary amount of vectors per cycle. In yet another example, the third amount of data is equal to an arbitrary amount of vectors per cycle. In yet another example, the fourth amount of data is equal to a lane dimension multiplied by a sublane dimension multiplied by a number of elements per vector register.

DETAILED DESCRIPTION

Figure 1:
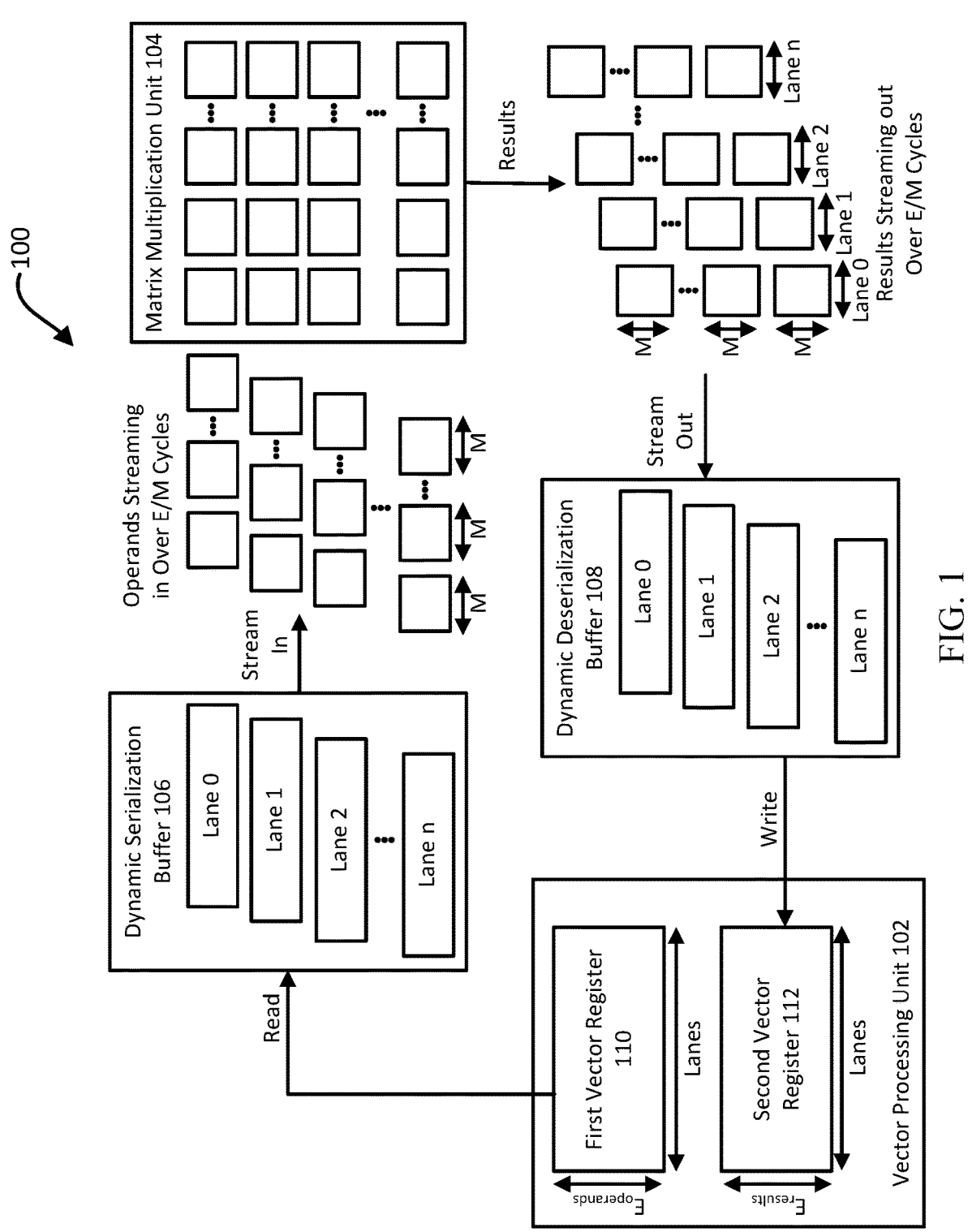
FIG. 1 depicts a block diagram of an example architecture for data processing according to aspects of the disclosure.

The technology relates generally to architectures for providing more flexibility in increasing the throughput of matrix multiplication units, such as systolic arrays. The architectures can stream in and out any arbitrary integer of vectors per cycle into and out of the matrix multiplication unit, respectively. Further, the architecture can perform arithmetic operations on any arbitrary integer number of vectors per cycle. This is achieved through a dynamic serialization buffer and a dynamic deserialization buffer coupled between a vector processing unit and the matrix multiplication unit.

The matrix multiplication unit can be any microarchitecture equipped to handle atomic matrix multiplication of a multiplicand matrix of any size. As an example, the matrix multiplication unit can be a systolic array. The vector processing unit can also be any microarchitecture having a lane dimension and a sublane dimension and containing any number of vector registers, where a vector register read from the vector processing unit provides a number of elements equal to the lane dimension multiplied by the sublane dimension multiplied by the number of elements per vector register. The elements are serialized over multiple cycles and streamed to the matrix multiplication unit.

The amount of data read from a first vector register is the lane dimension multiplied by the sublane dimension multiplied by the number of elements per vector register. That amount of data is streamed in through the dynamic serialization buffer into the matrix multiplication unit at an arbitrary rate of vectors per cycle. The matrix multiplication unit processes the vectors at the arbitrary rate and generates results at the arbitrary rate. The deserialization buffer receives the results streamed out of the matrix multiplication unit and assembles data until it contains an amount of data equal to the lane dimension multiplied by the sublane dimension multiplied by the number of elements per vector register. The deserialization buffer then outputs that amount of data to be written to a second vector register. The first vector register and the second vector register can be the same vector register or different vector registers, as examples.

The dynamic serialization buffer is coupled between a vector register and the matrix multiplication unit and is configured to take the vector register's worth of data, e.g., lane dimension multiplied by sublane dimension multiplied by number of elements per register, and emit an amount of vectors per cycle, where each vector is the size of the lane dimension. The amount of vectors per cycle can be any value from 1 to a value equivalent to the sublane dimension multiplied by the number of elements per vector register.

The serialization buffer is initially empty. On reading a vector register for a matrix multiplication instruction, elements are loaded into the buffer, where the number of elements can be equal to the sublane dimension multiplied by the number of elements per vector register. On the first cycle, the buffer streams out a number of elements to the matrix multiplication unit such that the content of the buffer reduces by the amount of elements streamed out. The cycles continue until a cycle where the buffer has a number of elements less than the number of elements streamed out to the matrix multiplication unit per cycle. At this cycle, the buffer is loaded with a new vector register's worth of data. The dynamic nature of the buffer allows for maintaining an arbitrary amount of vectors per cycle streaming throughput to the matrix multiplication unit.

The dynamic deserialization buffer is coupled between the matrix multiplication unit and a vector register and is configured to receive the results of a matrix multiplication produced by the matrix multiplication unit. The dynamic deserialization buffer can take in an amount of vectors per cycle, where each vector is a size equivalent to the lane dimension. The buffer emits one vector register's worth of data, e.g., lane dimension multiplied by sublane dimension multiplied by number of elements per vector register, upon assembling enough data to be written to the vector register. This can be at an average rate of the vector register's worth of data over a cycle number equal to the amount of vectors per cycle.

The deserialization buffer is initially empty. The matrix multiplication unit streams out an amount of vectors of results per cycle, which accounts for that amount of elements per cycle per lane streaming into the deserialization buffer. The deserialization buffer assembles the results until the number of elements in the buffer exceeds an amount which can be equal to the lane dimension multiplied by the sublane dimension multiplied by the number of elements per vector register for the result datatype. On the first cycle, the buffer contains a number of elements equal to the amount of vectors of results per cycle. On the second cycle, the buffer contains twice that number of elements. This process is repeated until a cycle when the buffer has more than an amount of elements. At this point the buffer is ready to write that amount of elements into the vector register. This leaves behind an amount of elements in the buffer, which is less than the amount of vectors of results per cycle. The dynamic nature of the buffer allows for maintaining an arbitrary amount of vectors per cycle streaming throughput out of the matrix multiplication unit.

FIG. 1 depicts a block diagram of an example architecture 100 for data processing. The architecture includes a vector processing unit 102, a matrix multiplication unit 104, a dynamic serialization buffer 106, and a dynamic deserialization buffer 108. Dataflow can occur from the vector processing unit 102 through the dynamic serialization buffer 106, matrix multiplication unit 104, dynamic deserialization buffer 108, and back to the vector processing unit 102. Alternatively, or additionally, dataflow can occur from a first vector processing unit to another vector processing unit (not shown).

The vector processing unit 102 can be any microarchitecture having a lane dimension and a sublane dimension. For example, the vector processing unit 102 can be a two-dimensional single instruction multiple data (SIMD) unit configured to perform an operation on multiple data operands concurrently. The lane dimension can be any multiple of 2, e.g., 64, 128, 256, and the sublane dimension can also be any multiple of 2, e.g., 4, 8, 16. The vector processing unit 102 can include any number of vector registers. For example, the vector processing unit 102 can include a first vector register 110 and a second vector register 112. For reading data, each vector register can provide a number of elements equal to the lane dimension of the vector processing unit 102 multiplied by the sublane dimension of the vector processing unit 102 multiplied by the number of elements per vector register. The elements per vector register can be serialized over multiple cycles and streamed to the matrix multiplication unit 104 through the dynamic serialization buffer 106.

The matrix multiplication unit 104 can be any microarchitecture for performing atomic matrix multiplication. The matrix multiplication unit 104 can process multiplicand matrices of any size, e.g., M by 256 matrices where M is any arbitrary integer value. For example, the matrix multiplication unit can be a systolic array having a plurality of cells, each including one or more arithmetic logic units, register files, and/or crossbars. The matrix multiplication unit 104 can deliver instructions systolically for processing data in a SIMD manner. For example, the matrix multiplication unit 104 can provides instructions through a spanning tree of cells, where predecessor cells to a left or top of a current cell have the previous instruction. A control unit at a top-left-corner of the matrix multiplication unit 104 can deliver an instruction to the upper-left-corner of the matrix multiplication unit 104. Instructions propagate along antidiagonal wavefronts through the matrix multiplication unit 104. For a given cell in the matrix multiplication unit 104, the cell can receive input from upstream adjacent neighbors and pass output along to downstream adjacent neighbors, where the terms upstream and downstream are relative to the direction the instructions or data is propagated through the matrix multiplication unit 104.

The dynamic serialization buffer 106 can include a plurality of lanes, each with a particular depth to be described further below. The number of lanes can be equal to the lane dimension of the vector processing unit 102. The dynamic serialization buffer 106 can read an amount of data from the first vector register 110. That amount of data can be the lane dimension multiplied by the sublane dimension multiplied by the number of elements per vector register. The dynamic serialization buffer 106 can stream that amount of data into the matrix multiplication unit 104 at an arbitrary rate of any number of vectors per cycle. The matrix multiplication unit 104 can process that amount of data at the arbitrary rate to generate resulting data.

The dynamic deserialization buffer 108 can include a plurality of lanes, each with a particular depth to be described further below. The number of lanes can be equal to the lane dimension of the vector processing unit 102. The matrix multiplication unit 104 can stream out the resulting data to the dynamic deserialization buffer 108. The deserialization buffer 108 can assemble resulting data over a number of cycles until the deserialization buffer 108 contains an amount of data. That amount of data can be the lane dimension multiplied by the sublane dimension multiplied by the number of elements per vector register. The deserialization buffer 108 can write that amount of data to the second vector register 112 at the arbitrary rate. Alternatively, or additionally, the deserialization buffer 108 can write that amount of data back to the first vector register 110.

Figure 2:
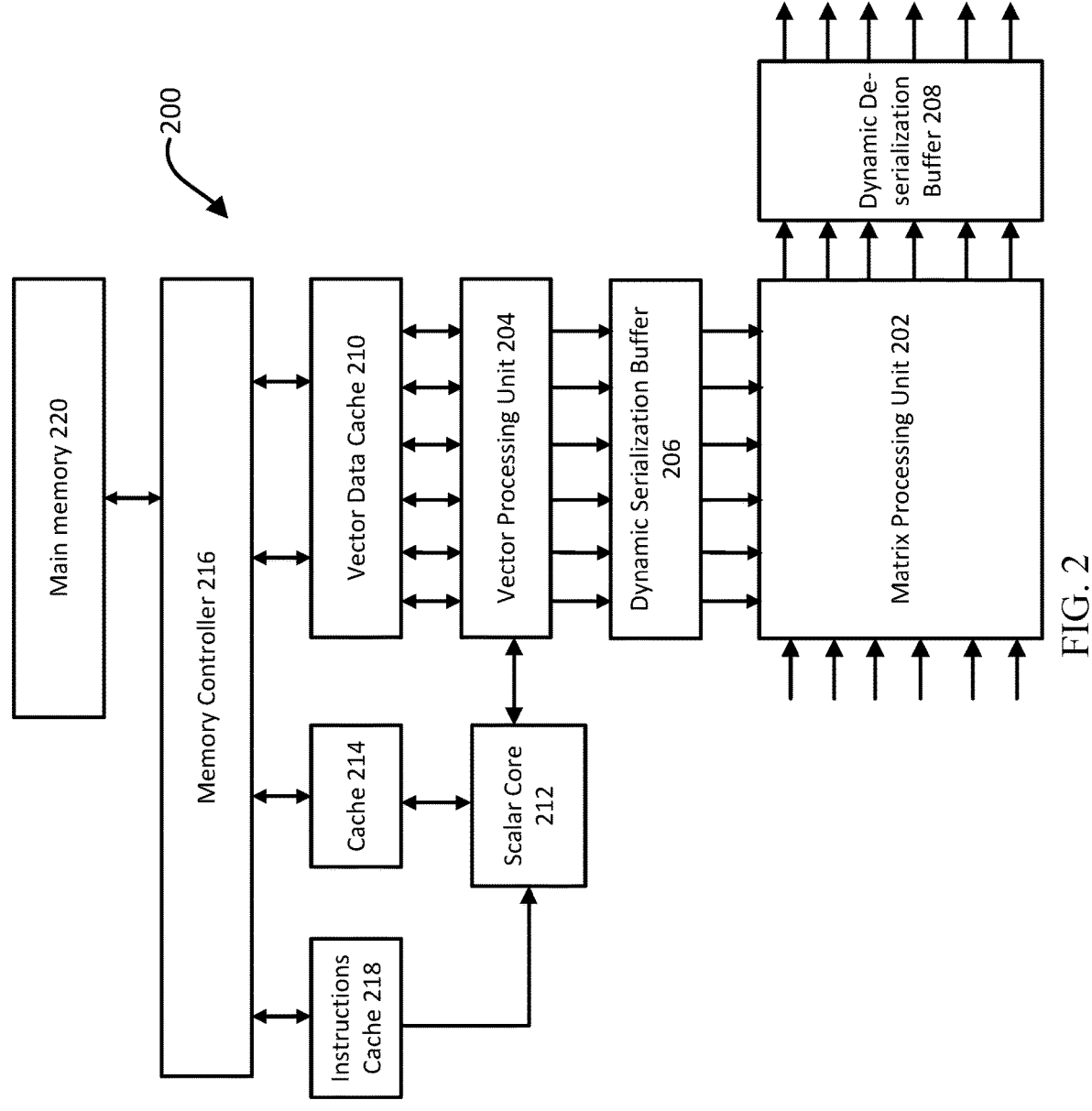
FIG. 2 depicts a block diagram of an example hardware implementation of an architecture for data processing according to aspects of the disclosure.

FIG. 2 depicts a block diagram of an example hardware implementation of an architecture 200 for data processing. The architecture 200 can correspond to the architecture 100 as depicted in FIG. 1.

The architecture 200 includes a matrix processing unit 202, with injection of input values from its left and top. The matrix processing unit 202 can correspond to the matrix multiplication unit 104 as depicted in FIG. 1. The matrix processing unit 202 can receive input from a vector processing unit 204 through a dynamic serialization buffer 206. The vector processing unit 204 and dynamic serialization buffer 206 can respectively correspond to the vector processing unit 102 and dynamic serialization buffer 106 as depicted in FIG. 1. For example, data from the vector processing unit 204 can be input to a top and left hand side of the matrix processing unit 202 through the dynamic serialization buffer 206. As another example, data from the vector processing unit 204 can be input to a top side of the matrix processing unit 202 through the dynamic serialization buffer 206 and data from a second vector processing unit (not shown) can be input to a left side of the matrix processing unit 202 through a second dynamic serialization buffer (not shown).

The matrix processing unit 202 can send outputs back to the vector processing unit 204 and/or to another vector processing unit (not shown) through a dynamic deserialization buffer 208. The dynamic deserialization buffer 208 can correspond to the dynamic deserialization buffer 108 as depicted in FIG. 1. For example, resulting data from the matrix processing unit 202 can be output from a right hand side of the matrix processing unit 202 through the dynamic deserialization buffer 208 back to the vector processing unit 204 to obtain full cycle connectivity. For instance, the vector processing unit 204 can use previous computations to process data in subsequent computations.

The vector processing unit 204 can communicate with a vector data cache 210 and a scalar core 212. The vector data cache 210 can be a cache or other type of memory or storage unit that holds vector data accessed by the vector processing unit 204. The scalar core 212 can communicate with a cache 214. The cache 214 can be a level 1 cache while the vector data cache 210 can be a level 2 cache from which level 1 data cache misses are served. The vector data cache 210 and the cache 214 can communicate with a memory controller 216. The scalar core 212 can supply inputs to the vector processing unit 204. Alternatively, or additionally, the scalar core 212 can supply inputs to the matrix processing unit 202. The scalar core 212 can receive instructions from an instructions cache 218, which can also communicate with the memory controller 216. The memory controller 216 can communicate with a main memory 220 of a computing system. The main memory 220 and/or memory controller 216 can enforce coherence among the caches 210, 214, 218.

The scalar core 212 and vector processing unit 204 may be part of a base core, built according to an instruction set architecture (ISA). The scalar core 212 can execute branches and generate addresses. The vector processing unit 204 can move data between a memory system and each cell of the matrix processing unit 202. The memory system may include, for example, one or more of the main memory 220, memory controller 216, and/or vector data cache 210, cache 214, and/or instructions cache 218. The base core can include a vector coprocessor expansion port for connection to the matrix processing unit 202. From the perspective of the vector processing unit 204, each cell of the matrix processing unit 202 may appear as a coprocessor or extension vector ALU, to which two source vectors are sent and one result vector per cycle is received in return.

As an example, the matrix processing unit 202 can be a systolic array of cells. Based on such architecture, the matrix processing unit 202 can perform operations such as sorting operations and/or semiring operations, e.g., compare, max-reduce, etc. As an example, the vector processing unit 204 can be a processor or computation unit that can operate on an entire vector in one instruction. The vector processing unit 204 can include a reduced instruction set computer (RISC)-V ISA or any other type of architecture. The vector processing unit 204 can include vectors of data, indices, block addresses, and/or other information. As an example, the scalar core 212 can be a processor that performs computations on one number or set of data at a time. The scalar core 212 may include, for example, RISC-V ISA extensions. The scalar core 212 can execute branches and generate addresses.

A sequencer can control an order in which instructions are executed by the scalar core 212, the vector processing unit 204, and the matrix processing unit 202. As an example, scalar, vector, and matrix instructions can all occur in a single instruction stream.

Figure 3:
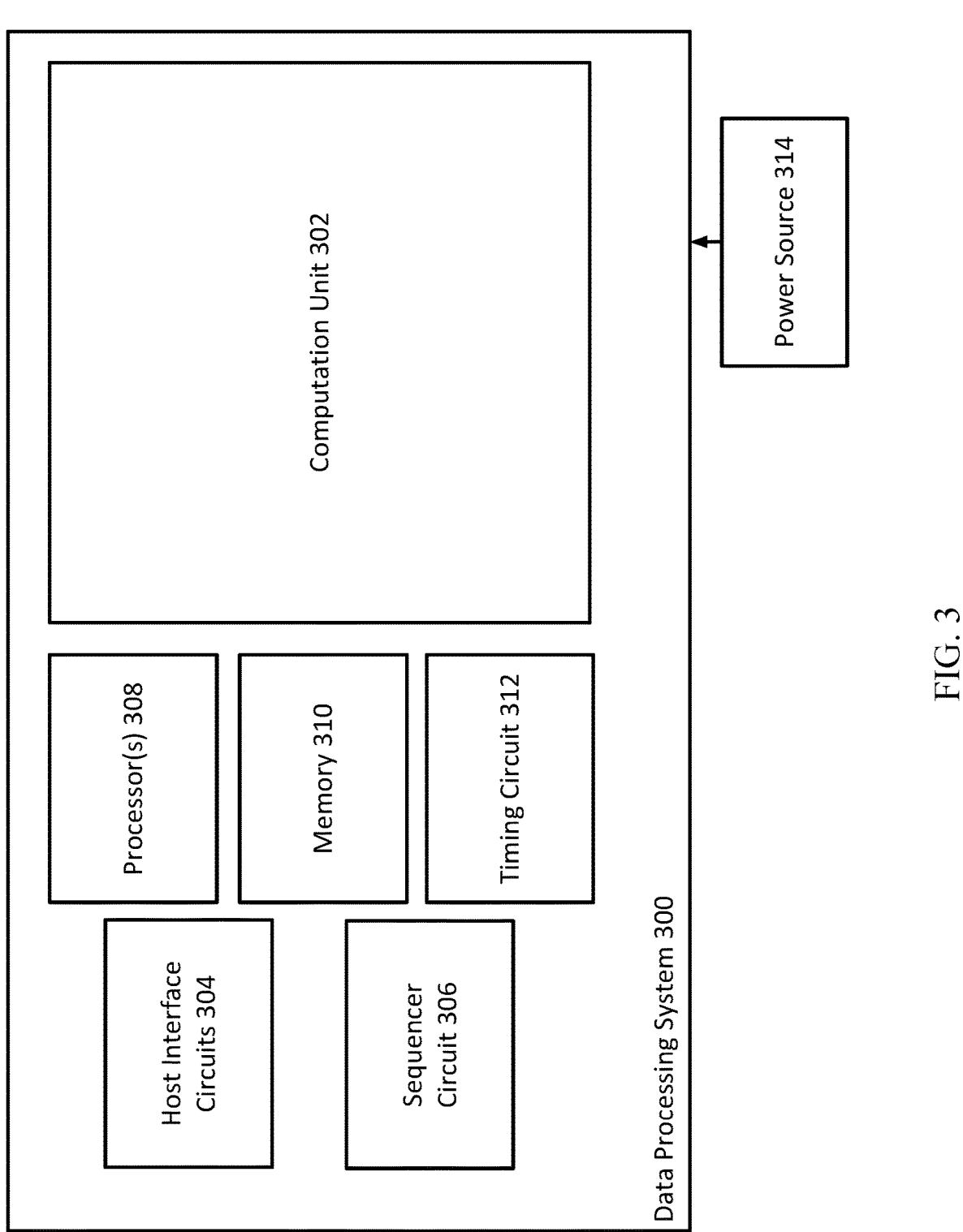
FIG. 3 depicts a block diagram of a data processing system implementing an example computation unit according to aspects of the disclosure.

FIG. 3 depicts a block diagram of a data processing system 300 implementing an example computation unit 302. The computation unit 302 can be or include any of a variety of different computation units, for example the vector processing unit and/or matrix multiplication unit as depicted in FIGS. 1-2.

The data processing system 300 can include a host interface 304, a sequencer circuit 306, one or more processors 308, memory 310, and a timing circuit 312. The data processing system 300 can be implemented in one or more devices across one or more physical locations, as described further with respect to FIG. 4. In some examples, the components of the data processing system 300 can be implemented on one or more chips, which can interface with a host device according to any of a variety of data bus or other physical interconnect interfaces. In some examples, the data processing system 300 can be implemented on one or more devices on a network, e.g., on one or more servers of a cloud platform.

Figure 4:
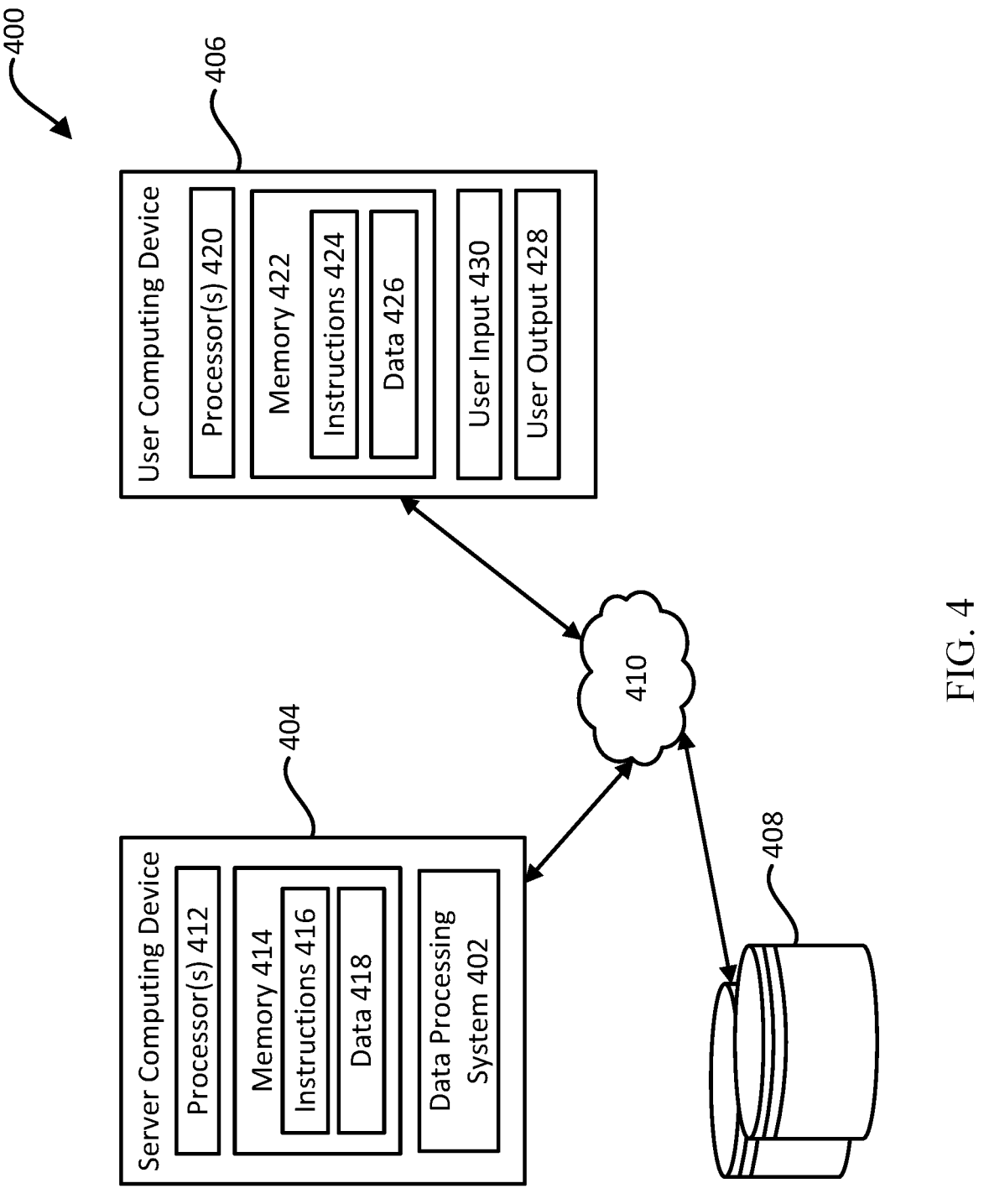
FIG. 4 depicts a block diagram of an example environment for implementing a data processing system including a computation unit according to aspects of the disclosure.

The processors 308 and memory 310 can be any of a variety of different types of processors and memory as described further with reference to FIG. 4. In some examples, the processors 308 receive instructions that are executable by the computation unit 302 for processing data. For example, the instructions can be part of a computer program written for performing operations using the computation unit 302.

The sequencer circuit 306 can convert the received instructions into one or more signals understood by the computation unit 302 which causes the computation unit 302 to perform any of a variety of preconfigured operations. These operations can include loading data, e.g., from the memory 310, into a matrix multiplication unit of the computation unit 302, moving data into one or more processing elements of the matrix multiplication unit, processing the data by the one or more processing elements, and pushing the data out of the matrix multiplication unit. The sequencer circuit 306 can also be configured to generate one or more control signals for controlling when instructions are pushed to the computation unit 302.

The host interface 304 can be configured to receive data from outside the data processing system 300, e.g., from a processor or another device, and send data generated by the computation unit 302, e.g., the product of matrix multiplication, to outside the data processing system 300, e.g., to one or more devices or processors.

The timing circuit 312 can be configured to control timing of the computation unit 302, e.g., its clock frequency or clock rate. For example, operations performed by the computation unit 302 may be performed once per clock cycle, with such clock cycles managed by the timing circuit 312.

The data processing system 300 can also be connected to a power source 314. The power source 314 can be a battery or other form of power available on a host device implementing the data processing system 300 or can be a source external to the host device and connected to the host device and the data processing system 300 through some wireless or physical connection, e.g., through wires. The power source 314 can supply voltage to the computation unit 302, which can be managed, e.g., adjusted higher or lower, by the processors 308.

FIG. 4 depicts a block diagram of an example environment 400 for implementing a data processing system 402 including a computation unit. The data processing system 402 can correspond to the data processing system 300 as depicted in FIG. 3. The data processing system 402 can be implemented on one or more devices having one or more processors in one or more locations, such as in server computing device 404. User computing device 406 and the server computing device 404 can be communicatively coupled to one or more storage devices 408 over a network 410. The storage devices 408 can be a combination of volatile and non-volatile memory and can be at the same or different physical locations than the computing devices 404, 406. For example, the storage devices 408 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 404 can include one or more processors 412 and memory 414. The memory 414 can store information accessible by the processors 412, including instructions 416 that can be executed by the processors 412. The memory 414 can also include data 418 that can be retrieved, manipulated, or stored by the processors 412. The memory 414 can be a type of non-transitory computer readable medium capable of storing information accessible by the processors 412, such as volatile and non-volatile memory. The processors 412 can include one or more central processing units (CPUs), graphic processing units (GPUs), field-programmable gate arrays (FPGAs), and/or application-specific integrated circuits (ASICs), such as tensor processing units (TPUs).

The instructions 416 can include one or more instructions that when executed by the processors 412, causes the one or more processors 412 to perform actions defined by the instructions 416. The instructions 416 can be stored in object code format for direct processing by the processors 412, or in other formats including interpretable scripts or collections of independent source code modules that are interpreted on demand or compiled in advance. The instructions 416 can include instructions for implementing the data processing system 402 as described herein. The data processing system 402 can be executed using the processors 412, and/or using other processors remotely located from the server computing device 404.

The data 418 can be retrieved, stored, or modified by the processors 412 in accordance with the instructions 416. The data 418 can be stored in computer registers, in a relational or non-relational database as a table having a plurality of different fields and records, or as JSON, YAML, proto, or XML documents. The data 418 can also be formatted in a computer-readable format such as, but not limited to, binary values, ASCII or Unicode. Moreover, the data 418 can include information sufficient to identify relevant information, such as numbers, descriptive text, proprietary codes, pointers, references to data stored in other memories, including other network locations, or information that is used by a function to calculate relevant data.

The user computing device 406 can also be configured similarly to the server computing device 404, with one or more processors 420, memory 422, instructions 424, and data 426. The user computing device 406 can also include a user output 428 and a user input 430. The user input 430 can include any appropriate mechanism or technique for receiving input from a user, such as keyboard, mouse, mechanical actuators, soft actuators, touchscreens, microphones, and sensors.

The server computing device 404 can be configured to transmit data to the user computing device 406, and the user computing device 406 can be configured to display at least a portion of the received data on a display implemented as part of the user output 428. The user output 428 can also be used for displaying an interface between the user computing device 406 and the server computing device 404. The user output 428 can alternatively or additionally include one or more speakers, transducers or other audio outputs, a haptic interface or other tactile feedback that provides non-visual and non-audible information to the platform user of the user computing device 1206.

Although FIG. 4 illustrates the processors 412, 420 and the memories 414, 422 as being within the computing devices 404, 406, components described herein can include multiple processors and memories that can operate in different physical locations and not within the same computing device. For example, the processors 412 can include a collection of processors that can perform concurrent and/or sequential operation.

The server computing device 404 can be configured to receive requests to process data from the user computing device 406. For example, the environment 400 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 406 may receive and transmit data specifying operations to be performed by the computation unit of the data processing system 402.

The computing devices 404, 406 can be capable of direct and indirect communication over the network 410. The computing devices 404, 406 can set up listening sockets that may accept an initiating connection for sending and receiving information. The network 410 itself can include various configurations and protocols including the Internet, World Wide Web, intranets, virtual private networks, wide area networks, local networks, and private networks using communication protocols proprietary to one or more companies. The network 410 can support a variety of short- and long-range connections. The short- and long-range connections may be made over different bandwidths, such as 2.402 GHz to 2.480 GHz (commonly associated with the Bluetooth® standard), 2.4 GHz and 11 GHz (commonly associated with the Wi-Fi® communication protocol); or with a variety of communication standards, such as the LTE® standard for wireless broadband communication. The network 410, in addition or alternatively, can also support wired connections between the computing devices 404, 406, including over various types of Ethernet connection.

Although a single server computing device 404, user computing device 406, and data processing system 402 are shown in FIG. 4, it is understood that aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof. In some examples, one or more devices implement one or more data processing systems, each data processing system including one or more computation units according to aspects of the disclosure. In some examples, a single device can implement multiple computation units, each of the multiple computation units configured to communicate with at least one other computation unit for performing a distributed data processing task, e.g., in sequential or parallel processing.

Figure 5:
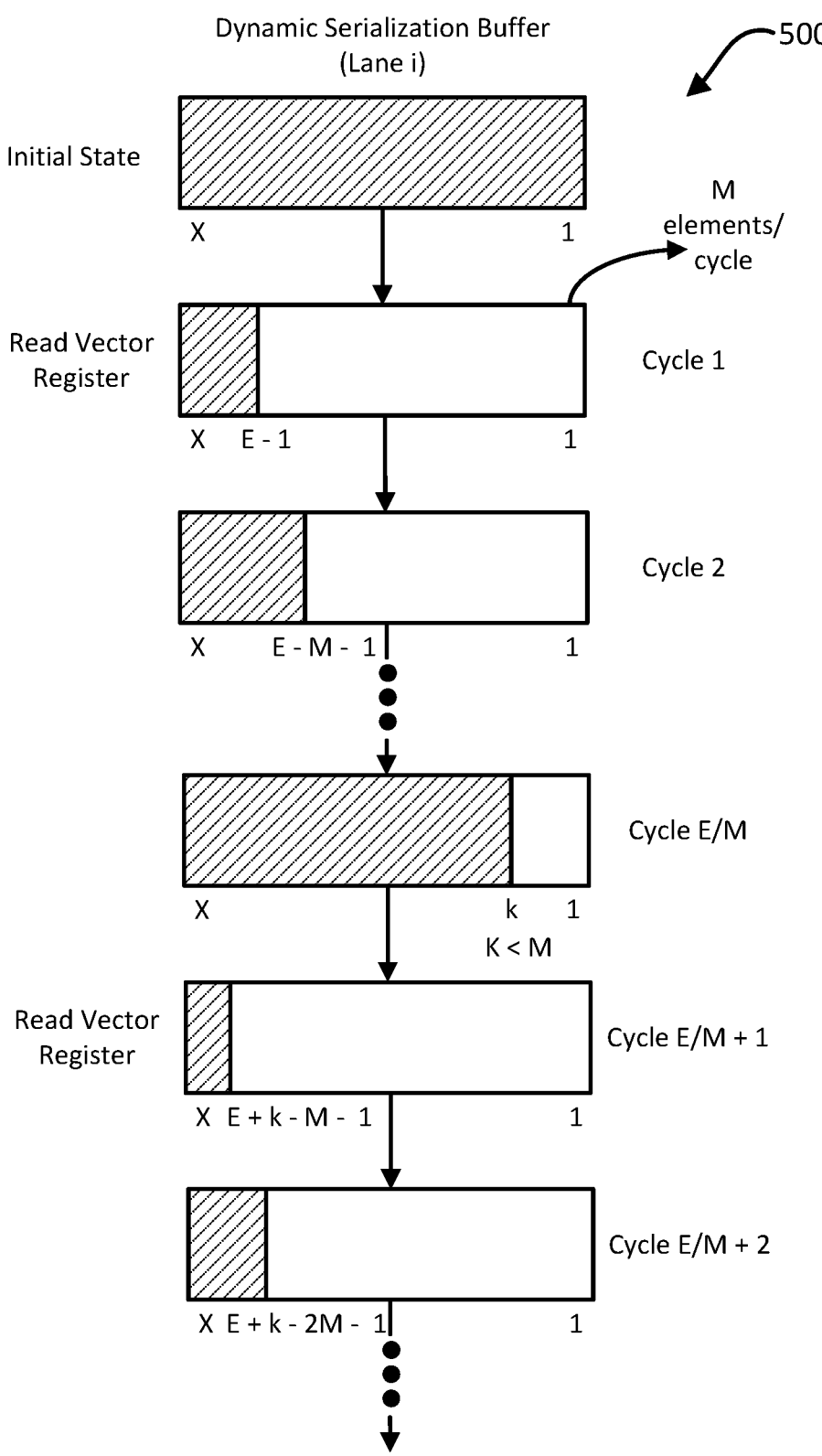
FIG. 5 depicts a flow diagram of an example process for processing data at each cycle through a lane of a dynamic serialization buffer according to aspects of the disclosure.

FIG. 5 depicts a flow diagram of an example process 500 for processing data at each cycle through a lane of a dynamic serialization buffer coupled between a vector processing unit and a matrix multiplication unit, such as the dynamic serialization buffer 106 as depicted in FIG. 1. The dynamic serialization buffer 106 can be configured to receive an amount of data from a vector register, where that amount of data can be equivalent to lane dimension multiplied by sublane dimension multiplied by number of elements per vector register. The dynamic serialization buffer 106 can further be configured to emit a number of vectors per cycle, where each vector can be the size of the lane dimension. The number of vectors per cycle can be any value from 1 to a value equivalent to the sublane dimension multiplied by the number of elements per vector register.

A lane i of the serialization buffer can be initially empty. At a first cycle 1, on reading a vector register for matrix multiplication instructions, the lane i receives a number of operand elements E. For example, the number of elements E can be equal to the sublane dimension multiplied by the number of elements per vector register. At the next cycle 2, the lane i can stream out a number of vectors M to the matrix multiplication unit. As such, the lane i reduces by the amount of vectors streamed out. For example, the lane i reduces by E-M. The cycles continue until a cycle number E/M, where the lane i has less than M elements. This amount of elements can be referred to as k. At the next cycle E/M+1, the lane i can receive additional operand elements E while streaming out a number of vectors M. As such, the lane i contains an amount of elements equivalent to E+k−M. At the next cycle E/M+2, the lane i can stream out a number of vectors M so that the lane i contains an amount of elements equivalent to E+k−2M. The cycles continue again until a cycle 2E/M, where the lane i again has less than M elements. The process 500 can occur continuously as needed to perform the data processing. The process 500 allows for maintaining M vectors per cycle streaming throughput to the matrix multiplication unit.

The depth X of the dynamic serialization buffer 106 can be based on the maximum value of k for any configurations of E and M. For example, if E=32, and M=7, the maximum k can be 6. As another example, if E=64 and M=10, the maximum k can be 8. More generally, the maximum k is based on the maximum of the remainder of E multiplied by a value j/M, where j is a whole number. For example, $$k_{max} = \max\left(\text{rem}\left(E \times \frac{j}{M}\right)\right)$$

where k=0, 1, 2, . . . , and X=E+k_{max}.

Figure 6:
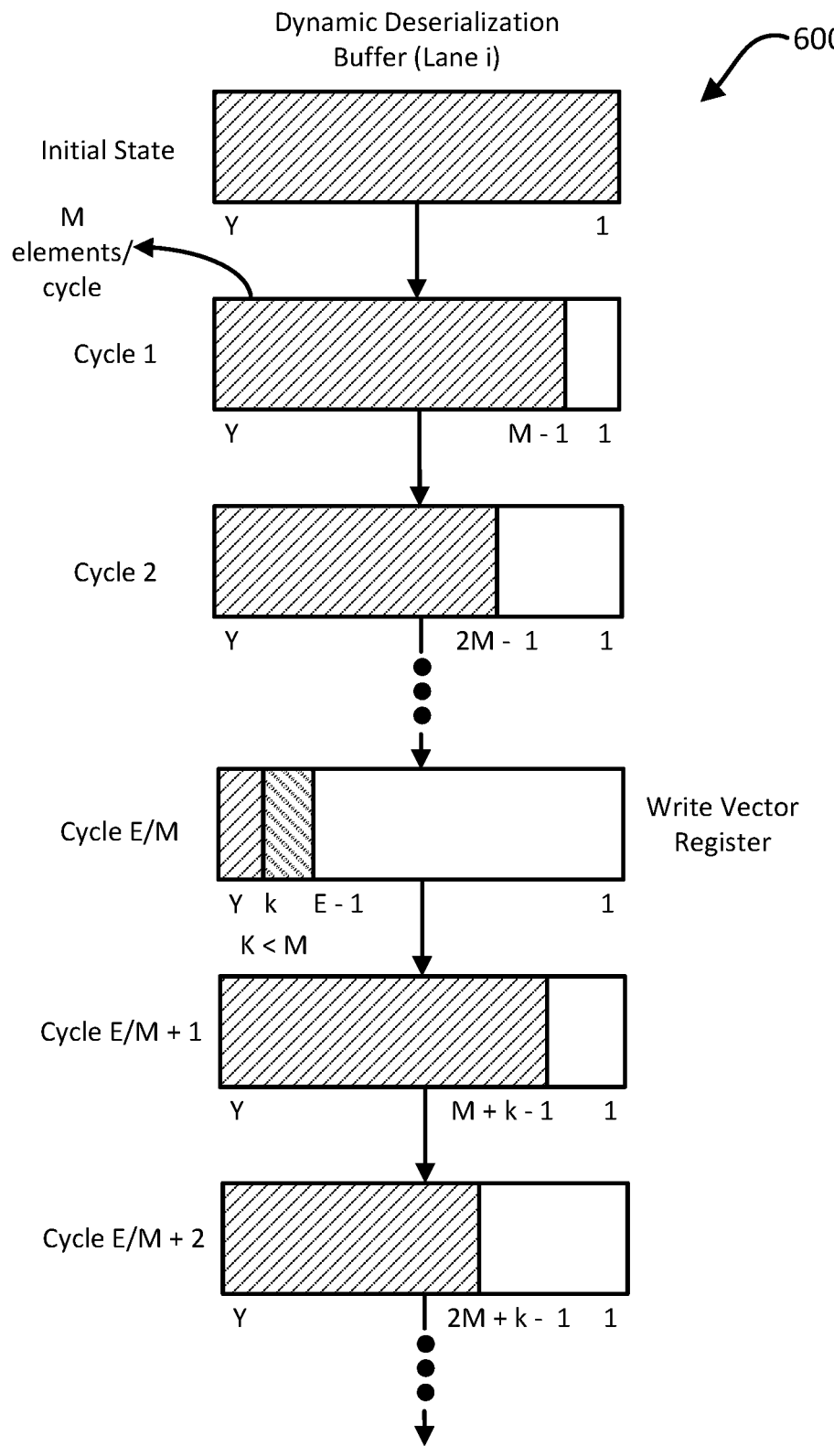
FIG. 6 depicts a flow diagram of an example process for processing data at each cycle through a lane of a dynamic deserialization buffer according to aspects of the disclosure.

FIG. 6 depicts a flow diagram of an example process 600 for processing data at each cycle through a lane of a dynamic deserialization buffer coupled between a matrix multiplication unit and a vector processing unit, such as the dynamic deserialization buffer 108 as depicted in FIG. 1. The dynamic deserialization buffer 108 can be configured to receive results of a matrix multiplication produced by the matrix multiplication unit. The dynamic deserialization buffer 108 can receive a number of vectors per cycle, where each vector can be the size of the lane dimension. The dynamic deserialization buffer 108 can further be configured to emit an amount of data from a vector register, where that amount of data can be equivalent to lane dimension multiplied by sublane dimension multiplied by number of elements per vector register, upon assembling enough data to be written to the vector register.

A lane i of the deserialization buffer 108 can be initially empty. At a first cycle 1, the lane i receives a number M of vectors of results from the matrix multiplication unit. At the next cycle 2, the lane i can further receive an additional M vectors of results, such that the lane i contains 2M elements. The cycles continue until a cycle number E/M where the number of elements in the lane i exceeds an amount of result elements E. For example, the amount of result elements E can be equal to the sublane dimension multiplied by the number of elements per vector register for the result data-type. At this cycle E/M, the lane i can write the result elements E into a vector register, leaving behind an amount of elements in the buffer that is less than M elements. This amount of elements can be referred to as k. At the next cycle E/M+1, the lane i can receive additional M vectors of results, such that the lane i contains k+M elements. At the next cycle E/M+2, the lane i can receive another additional M vectors of results, such that the lane i contains k+2M elements. The cycles continue again until a cycle 2E/M, where the lane i again has a number of elements exceeding E. The process 600 can occur continuously as need to perform the data processing. The process 600 allows for maintaining M vectors per cycle streaming throughput out of the matrix multiplication unit.

The depth Y of the dynamic serialization buffer 108 can be based on the maximum value of k for any configurations of E and M. For example, if E=16, and M=10, the maximum k can be 8. More generally, the maximum k is based on the maximum of M multiplied by j and then subtracted by E, where j is a whole number. For example, k_{max}=max ((M× j)−E) where j=0, 1, 2, . . . , and Y=E+k_{max}.

Figure 7:
FIG. 7 depicts an example programming sequence for a matrix multiplication unit according to aspects of the disclosure.
Figure 7:
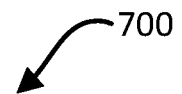

FIG. 7 depicts an example programming sequence 700 for the matrix multiplication unit illustrating an irregular cadence of matrix multiply instructions, referred to as vmatmul. A vmatmul instruction can operate on an amount of data P multiplied by the amount of data received from a vector register, and can produce an amount of data Q multiplied by the amount of data sent to a vector register. For example, a vmatmul instruction can operate on an amount of data equivalent to P multiplied by lane dimension multiplied by sublane dimension multiplied by number of elements per vector register, and the vmatmul instruction can produce an amount of data equivalent to Q multiplied by lane dimension multiplied by sublane dimension multiplied by number of elements per vector register. Q can be related to P, where Q=P multiplied by a result datatype divided by an operand datatype. For example, if operand datatype is 16-bit, result datatype is 32-bit, and P=2, then Q=4. At a throughput of M vectors per cycle, a vmatmul instruction can be issued every sublane dimension multiplied by number of elements per vector register divided by M cycles. Since the sublane dimension and the number of elements per vector register are powers of 2, not all values of M can yield an integer number of cycles, resulting in an irregular cadence of programming.

The example programming sequence 700 is based on M=12, sublane dimension=16, and number of elements per vector register=4. Here, 12 vectors per cycle are being processed and 64 vectors are processed in total for a vmatmul instruction. After 5 cycles, 60 vectors from vector register v0 have been processed. In the 6th cycle, a new vmatmul instruction can be issued, the remaining 4 vectors from vector register v0 can be processed, and 8 vectors from vector register v1 can be processed. This can continue such that a vmatmul instruction can be issued every 5, 5, and 6 cycles over a course of 3 instructions, averaging 5.33 cycles.

Figure 8:
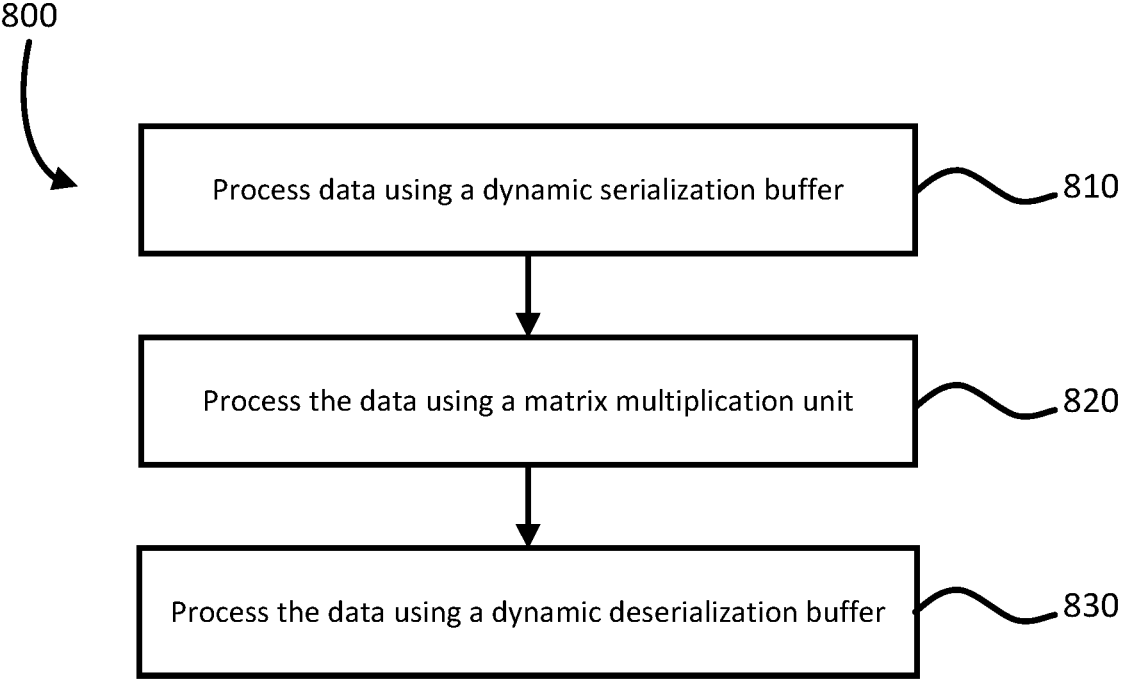
FIG. 8 depicts a flow diagram of an example process for arbitrary throughput of matrix multiplication according to aspects of the disclosure.

FIG. 8 depicts a flow diagram of an example process 800 for arbitrary throughput of matrix multiplication. The example process can be performed on a system of one or more processors in one or more locations, such as the architecture 100 as depicted in FIG. 2.

As shown in block 810, the dynamic serialization buffer 106 of the architecture 100 can process data. The dynamic serialization buffer 106 can be configured to receive a first amount of data from a first vector register of a vector processing unit. For example, the first amount of data can be equal to a lane dimension of the vector processing unit multiplied by a sublane dimension of the vector processing unit multiplied by a number of elements per vector register of the vector processing unit. The dynamic serialization buffer 106 can be configured to output a second amount of data at each of a number of cycles until the dynamic serialization buffer 106 contains an amount of data less than the second amount of data. The second amount of data can be less than the first amount of data. For example, the second amount of data can equal an arbitrary amount of vectors per cycle. In response to containing the amount of data less than the second amount of data, the dynamic serialization buffer 106 can be configured to receive a subsequent first amount of data from the first vector register or a second vector register of the vector processing unit or another vector processing unit. The serialization buffer 106 can have a depth based on a maximum amount of data that the amount of data less than the second amount of data can be.

As shown in block 820, the matrix multiplication unit 104 of the architecture 100 can process the data. The matrix multiplication unit 104 can be a systolic array. The matrix multiplication unit can be configured to receive the second amount of data, such as at each of the cycles. The matrix multiplication unit 104 can process the second amount of data, such as at each of the cycles, to generate a third amount of data representing results of the matrix multiplication unit 104. For example, the third amount of data can be equal to an arbitrary amount of vectors per cycle. The second amount of data and the third amount of data can be an equal amount or different amounts. The matrix multiplication unit 104 can output the third amount of data, such as at each of the cycles.

As shown in block 830, the dynamic deserialization buffer 108 of the architecture 100 can process the data. The dynamic deserialization buffer 108 can be configured to receive the third amount of data at each of the cycles until the dynamic deserialization buffer 108 contains an amount of data greater than a fourth amount of data. The fourth amount of data can be greater than the third amount of data. For example, the fourth amount of data can be equal to a lane dimension of the vector processing unit multiplied by a sublane dimension of the vector processing unit multiplied by a number of elements per vector register of the vector processing unit. In response to containing the amount of data greater than the fourth amount of data, the dynamic deserialization buffer 108 can output the fourth amount of data to the first vector register, the second vector register, or a third vector register of the vector processing unit or another vector processing unit. The deserialization buffer can have a depth based on a maximum amount of data that can remain in the deserialization buffer when the fourth amount of data is output.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An architecture for arbitrary throughput of matrix multiplication, the architecture comprising:
   a dynamic serialization buffer coupled to an input of a matrix multiplication unit and a dynamic deserialization buffer coupled to an output of the matrix multiplication unit;
   the dynamic serialization buffer configured to:
      receive a first amount of data from a first vector register;
      output a second amount of data, the second amount of data being less than the first amount of data, at each of a number of cycles until the dynamic serialization buffer contains an amount of data less than the second amount of data; and
      based on containing the amount of data less than the second amount of data, receive a subsequent first amount of data from the first vector register or a second vector register;
   the matrix multiplication unit configured to:
      receive the second amount of data;
      process the second amount of data to generate a third amount of data representing results of the matrix multiplication; and
      output the third amount of data; and
   the dynamic deserialization buffer configured to:
      receive the third amount of data at each of the number of cycles until the dynamic deserialization buffer contains an amount of data greater than a fourth amount of data, the fourth amount of data being greater than the third amount of data; and
      based on containing the amount of data greater than the fourth amount of data, output the fourth amount of data to the first vector register, the second vector register, or a third vector register.

2. The architecture of claim 1, further comprising a vector processing unit comprising at least one of the first vector register, second vector register, or third vector register.

3. The architecture of claim 1, wherein the matrix multiplication unit is a systolic array.

4. The architecture of claim 1, wherein the first amount of data is equal to a lane dimension multiplied by a sublane dimension multiplied by a number of elements per vector register.

5. The architecture of claim 1, wherein the second amount of data is equal to an arbitrary amount of vectors per cycle.

6. The architecture of claim 1, wherein the third amount of data is equal to an arbitrary amount of vectors per cycle.

7. The architecture of claim 1, wherein the second amount of data and the third amount of data are equivalent.

8. The architecture of claim 1, wherein the fourth amount of data is equal to a lane dimension multiplied by a sublane dimension multiplied by a number of elements per vector register.

9. The architecture of claim 1, wherein the dynamic serialization buffer has a depth based on a maximum amount of data that the amount of data less than the second amount of data can be.

10. The architecture of claim 1, wherein the dynamic deserialization buffer has a depth based on a maximum amount of data that can remain in the deserialization buffer when the fourth amount of data is output.

11. A method for operating an architecture for arbitrary throughput of matrix multiplication, the architecture including a dynamic serialization buffer coupled to an input of a matrix multiplication unit and a dynamic deserialization buffer coupled to an output of the matrix multiplication unit, the method comprising:

receiving, by the dynamic serialization buffer, a first amount of data from a first vector register;

outputting, by the dynamic serialization buffer, a second amount of data, the second amount of data being less than the first amount of data, at each of a number of cycles until the dynamic serialization buffer contains an amount of data less than the second amount of data;

based on containing the amount of data less than the second amount of data, receiving, by the dynamic serialization buffer, a subsequent first amount of data from the first vector register or a second vector register;

receiving, by the matrix multiplication unit, the second amount of data;

processing, by the matrix multiplication unit, the second amount of data to generate a third amount of data representing results of the matrix multiplication;

outputting, by the matrix multiplication unit, the third amount of data;

receiving, by the dynamic deserialization buffer, the third amount of data at each of the number of cycles until the dynamic deserialization buffer contains an amount of data greater than a fourth amount of data, the fourth amount of data being greater than the third amount of data; and based on containing the amount of data greater than the fourth amount of data, outputting, by the dynamic deserialization buffer, the fourth amount of data to the first vector register, the second vector register, or a third vector register.

12. The method of claim 11, wherein the first amount of data is equal to a lane dimension multiplied by a sublane dimension multiplied by a number of elements per vector register.

13. The method of claim 11, wherein the second amount of data is equal to an arbitrary amount of vectors per cycle.

14. The method of claim 11, wherein the third amount of data is equal to an arbitrary amount of vectors per cycle.

15. The method of claim 11, wherein the fourth amount of data is equal to a lane dimension multiplied by a sublane dimension multiplied by a number of elements per vector register.

16. A non-transitory computer readable medium storing instructions that, when executed by one or more processors, cause the one or more processors to perform operations for operating an architecture for arbitrary throughput of matrix multiplication, the architecture including a dynamic serialization buffer coupled to an input of a matrix multiplication unit and a dynamic deserialization buffer coupled to an output of the matrix multiplication unit, the operations comprising:

receiving, by the dynamic serialization buffer, a first amount of data from a first vector register;

outputting, by the dynamic serialization buffer, a second amount of data, the second amount of data being less than the first amount of data, at each of a number of cycles until the dynamic serialization buffer contains an amount of data less than the second amount of data;

based on containing the amount of data less than the second amount of data, receiving, by the dynamic serialization buffer, a subsequent first amount of data from the first vector register or a second vector register;

receiving, by the matrix multiplication unit, the second amount of data;

processing, by the matrix multiplication unit, the second amount of data to generate a third amount of data representing results of the matrix multiplication;

outputting, by the matrix multiplication unit, the third amount of data;

receiving, by the dynamic deserialization buffer, the third amount of data at each of the number of cycles until the dynamic deserialization buffer contains an amount of data greater than a fourth amount of data, the fourth amount of data being greater than the third amount of data; and based on containing the amount of data greater than the fourth amount of data, outputting, by the dynamic deserialization buffer, the fourth amount of data to the first vector register, the second vector register, or a third vector register.

17. The non-transitory computer readable medium of claim 16, wherein the first amount of data is equal to a lane dimension multiplied by a sublane dimension multiplied by a number of elements per vector register.

18. The non-transitory computer readable medium of claim 16, wherein the second amount of data is equal to an arbitrary amount of vectors per cycle.

19. The non-transitory computer readable medium of claim 16, wherein the third amount of data is equal to an arbitrary amount of vectors per cycle.

20. The non-transitory computer readable medium of claim 16, wherein the fourth amount of data is equal to a lane dimension multiplied by a sublane dimension multiplied by a number of elements per vector register.

\* \* \* \* \*